(12) United States Patent
Kerekes

(10) Patent No.: US 6,492,651 B2
(45) Date of Patent: Dec. 10, 2002

(54) SURFACE SCANNING SYSTEM FOR SELECTIVE DEPOSITION MODELING

(75) Inventor: Thomas A. Kerekes, Calabasas, CA (US)

(73) Assignee: 3D Systems, Inc., Valencia, CA (US)

(*) Notice: Subject to any disclaimer, the term of this patent is extended or adjusted under 35 U.S.C. 154(b) by 31 days.

(21) Appl. No.: 09/779,355

(22) Filed: Feb. 8, 2001

(65) Prior Publication Data
US 2002/0104973 A1 Aug. 8, 2002

(51) Int. Cl.[7] ............................................. G01N 21/86
(52) U.S. Cl. ..................... 250/559.2; 250/548; 356/3.01
(58) Field of Search ..................... 250/559.2, 559.19, 250/559.01, 548; 356/3.01–3.09, 625, 627; 382/276, 285, 295, 154, 312; 347/1, 37

(56) References Cited

U.S. PATENT DOCUMENTS

| | | |
|---|---|---|
| 4,678,324 A | 7/1987 | De Witt |
| 4,939,379 A | 7/1990 | Horn |
| 5,017,753 A | 5/1991 | Deckard |
| 5,136,515 A | 8/1992 | Helinski |
| 5,236,637 A | 8/1993 | Hull |
| 5,287,435 A * | 2/1994 | Cohen et al. ............... 264/183 |
| 5,303,141 A | 4/1994 | Batchelder et al. |
| 5,555,176 A | 9/1996 | Menhennett et al. |
| 5,572,431 A | 11/1996 | Brown et al. |
| 5,594,652 A * | 1/1997 | Penn et al. .................. 345/419 |
| 5,602,399 A * | 2/1997 | Mizutani ..................... 250/548 |
| 5,859,775 A | 1/1999 | Barlage, III et al. |
| 5,870,220 A | 2/1999 | Migdal et al. |
| 5,943,235 A | 8/1999 | Earl et al. |
| 6,031,941 A | 2/2000 | Yano et al. |
| 6,110,409 A | 8/2000 | Allanic et al. |
| 6,147,760 A | 11/2000 | Geng |
| 6,305,769 B1 * | 10/2001 | Thayer et al. ................. 347/1 |

FOREIGN PATENT DOCUMENTS

WO   WO 00/52624   9/2000

\* cited by examiner

Primary Examiner—Kevin Pyo
Assistant Examiner—Seung C. Sohn
(74) Attorney, Agent, or Firm—James E. Curry (57) ABSTRACT

A closed loop selective deposition modeling apparatus having a surface scanning system for actively monitoring the surface height of a layer of a three-dimensional object as it is being built by selectively dispensing a build material. The surface scanning system directs a beam of energy on the surface of the object that establishes an illumination zone which emits scattered light, and has a detector which senses the scattered light and produces a response indicative of the surface condition of the object. The response is processed to establish a plurality of height data signals that are further processed to produce feedback data. The feedback data is then utilized to selectively dispense the build material to desired locations on the surface of the object to therein dimensionally normalize the layer of the object being formed.

30 Claims, 8 Drawing Sheets

SURFACE SCANNING SYSTEM FOR SELECTIVE DEPOSITION MODELING

BACKGROUND OF THE INVENTION

1. Field of the Invention

The invention relates in general to solid freeform fabrication and, in particular, to a surface scanning system for generating a plurality of surface height measurements for use in dimensionally normalizing layers of a three-dimensional model being built by a closed loop selective deposition modeling apparatus dispensing a liquid, powder, or paste.

2. Description of the Prior Art

In selective deposition modeling, herein referred to as "SDM", complex parts are produced from a modeling material in an additive fashion as opposed to traditional fabrication techniques, which are generally subtractive in nature. For example, in traditional fabrication techniques material is removed by machining operations or shaped in a die or mold to near net shape and then trimmed. In contrast, additive fabrication techniques such as SDM incrementally add portions of a build material to targeted locations, layer by layer, in order to build a complex part.

In SDM, a solid modeling material is physically deposited in successive fashion to form an object. In one type of SDM technology the solid modeling material is extruded as a continuous filament through a resistively heated nozzle. In yet another type of SDM technology, the solid modeling material is jetted or dropped in discrete droplets in order to build up a part. Often, a thermoplastic material having a low-melting point is used as the solid modeling material, which is delivered through a jetting system such as those used in ink-jet printers. One type of SDM process utilizing ink-jet print heads is described, for example, in U.S. Pat. No. 5,555,176 to Menhennett, et al. Another type of SDM process which extrudes a bead of material to build a part is described, for example, in U.S. Pat. No. 5,303,141 to Batchelder et al. Still others dispense two different solidifiable materials such as the SDM process described in U.S. Pat. No. 5,136,515 to Helinski. In addition, other SDM processes dispense sintered powders as described in U.S. Pat. No. 5,017,753 to Deckard, pastes as described in U.S. Pat. No. 6,110,409 to Allanic et al., and liquids as described in U.S. Pat. No. 5,236,637 to Hull.

Although SDM methods have many advantages compared to conventional fabrication methods, they also have inherent problems rooted in the layer by layer building process. One common problem in the layer by layer building process results from the dimensional variability inherent in the building of each layer. These dimensional inaccuracies result from numerous phenomena, such as the accumulated effects of drop volume variation, thermal distortion, errors in deposition, and the like. In addition, the type of geometrical configurations being formed can also influence these inaccuracies, such as the production of web or branching supports. Also, a weakened dispensing jet will contribute to these inaccuracies. If unchecked, these tolerances can accumulate throughout the part as it is built up in height layer by layer. As the thickness of layers are reduced in order to achieve greater surface resolution, the accumulated effects of these undesirable tolerances can substantially distort the resultant part. Thus, most SDM processes require some method to dimensionally normalize or smooth the top working surface of the part while it is being built. In addition, the maximum build rate of the object is limited by the slowest build rate position of a given layer being formed. Generally, most conventional dimensional normalization methods involve systems which physically adjust the vertical height of the part by smoothing or leveling the build material deposited in the layers, often producing waste material. Such systems are typically open loop systems that are hardwired and utilize no active feedback to compensate the build rate of the layer. For example, in one open loop approach, each layer of build material is dispensed at a greater thickness than desired and then the normalizing device is activated to remove the excess build material to achieve the desired thickness. Although distortions between the layers are eliminated, undesirable waste material is generated.

An example of the excess build material approach is found in U.S. Pat. No. 5,943,235 to Earl et al., wherein a pre-heated rotating planarizer is provided to normalize each layer. Under this approach, after a layer of build material has been to deposited by the SDM apparatus in excess of the necessary amount to achieve a desired thickness, the pre-heated cylindrical roller (planarizer) is precisely passed over the deposited material. The rolling planarizer locally melts a portion of the build material of the layer. Some of the material adheres to the surface of the planarizer as it rolls to thereby dimensionally normalize the deposited layer to conform to the desired thickness of the layer. A wiping or scraping device such as a blade is needed to peel or skive off the excess build material from the planarizer, producing waste material. This approach has drawbacks; for instance, the build time is increased due to the deposition of material that is later removed by the planarizer as waste. In addition, the rolling planarizer must be manufactured to precise tolerances in order to achieve the desired accuracy. It is also difficult to precisely regulate and maintain the temperature of the surface of the planarizer. The planarizer is also thermally inefficient as it consumes a significant amount of energy that is undesirably dissipated into the environment. The planarizer also occupies a significant amount of space within the SDM apparatus and thereby limits the over-travel distance of the dispensing carriage. The planarizer also has moving parts that are subject to wear and degradation. Airborne contaminants are also prone to accumulate on the planarizer. In short, the heated rotating planarizer adds significant cost and complexity to an SDM apparatus, occupies precious space, adds inertia, is subject to wear, requires maintenance and adjustment, and increases build time.

Other approaches to providing a system to dimensionally normalize a part while being built by an SDM apparatus are found in U.S. Pat. No. 5,859,775 to Barlage, III et al. and U.S. Pat. No. 5,572,431 to Brown et al. Under these approaches, a heated body is selectively driven across the dispensed build material in response to a sensed deviation in order to melt and displace the build material. The excess material is then sucked off by a vacuum source connected to the heated body. Thus, dimensional normalization is discretely accomplished by expelling waste material, thereby increasing build time.

Undesirably, all these approaches involve making physical contact with the layer of the object as it is built. Because of this, the types of material that can be dispensed to form the layers are limited to those that can both be locally melted and removed, or can be planed or machined. Furthermore, they must leave a desirable surface finish after being normalized. In addition, removal of waste material generally runs contrary to the advantages of the additive nature of the SDM fabrication process.

Thus, there is a need to provide an SDM process capable of dimensionally normalizing layers of a three-dimensional object without generating waste build material. There is also a need to decrease build time by eliminating the steps of depositing excess build material for each layer. There is also a need to dimensionally normalize the layers without making physical contact with the layers. These and other difficulties of the prior art have been overcome according to the present invention.

BRIEF SUMMARY OF THE INVENTION

The present invention provides its benefits across a broad spectrum of three-dimensional building processes. While the description which follows hereinafter is meant to be representative of a number of such applications, it is not exhaustive. As will be understood, the basic apparatus and methods taught herein can be readily adapted to many uses. It is intended that this specification and the claims appended hereto be accorded a breadth in keeping with the scope and spirit of the invention being disclosed despite what might appear to be limiting language imposed by the requirements of referring to the specific examples disclosed.

It is one aspect of the present invention to form a three-dimensional object with an SDM apparatus at the highest build speeds possible.

It is another aspect of the present invention to dimensionally normalize the layers of a three-dimensional object by an SDM apparatus without generating waste material.

It is yet another aspect of the present invention to dimensionally normalize the layers of a three-dimensional object being formed by an SDM apparatus without making physically contact with the build material already dispensed in the layers with a separate device.

It is still yet another aspect of the present invention to form a three-dimensional object according to a closed loop SDM technique responsive to feedback data.

It is a feature of the present invention to actively monitor the surface height of any portion of a layer of a three-dimensional object while being formed by an SDM apparatus.

It is another feature of the present invention to develop height data signals of the surface of a portion of a layer of a three-dimensional object formed by an SDM apparatus.

It is yet another feature of the present invention to process the height data signals to produce feedback data for selectively dispensing build material in desired locations on the surface of the portion of a layer.

It is yet another feature of the present invention to utilize a surface scanning system consisting of an energy beam directed onto the surface of the object to establish an illumination zone that emits scattered light, and a detector having sensors which monitor the surface height condition of the object by collecting the scattered light.

It is an advantage of the present invention that each layer of an object formed by the SDM apparatus can be dimensionally normalized without generating waste material and thereby eliminate the need for a waste collection tank and waste umbilical.

It is another advantage of the present invention that the build speed of the SDM apparatus is significantly increased by eliminating the time involved in depositing build material in excess for each layer that must be removed as waste.

It is yet another advantage of the present invention that maintenance and service of the SDM apparatus can be significantly decreased as a result of the elimination of mechanical systems previously needed to physically contact and remove excess build material.

It is still yet another advantage of the present invention that a closed loop system is used that can actively adjust the build process in response to monitored imperfections on the surface of the layers during the build process.

And it is still yet another advantage of the present invention that a wider variety of materials can be dispensed from an SDM apparatus to form three-dimensional objects.

These and other aspects, features, and advantages are achieved/attained in the method and apparatus of the present invention that employs a surface scanning system that generates a plurality of surface height data signals of a layer of build material dispensed in response to data descriptive of the layer of a three-dimensional object being built by a SDM technique. The height data signals are processed to establish feedback data that is then utilized to selectively dispense the build material in desired locations on the layer such as in low areas to achieve a desired thickness, and to avoid dispensing material in locations that may have excess material.

BRIEF DESCRIPTION OF THE DRAWINGS

The aspects, features, and advantages of the present invention will become apparent upon consideration of the following detailed disclosure of the invention, especially when it is taken in conjunction with the accompanying drawings wherein.

To facilitate understanding, identical reference numerals have been used, where possible, to designate identical elements that are common in the figures.

DETAILED DESCRIPTION OF THE PREFERRED EMBODIMENTS

Figure 1:
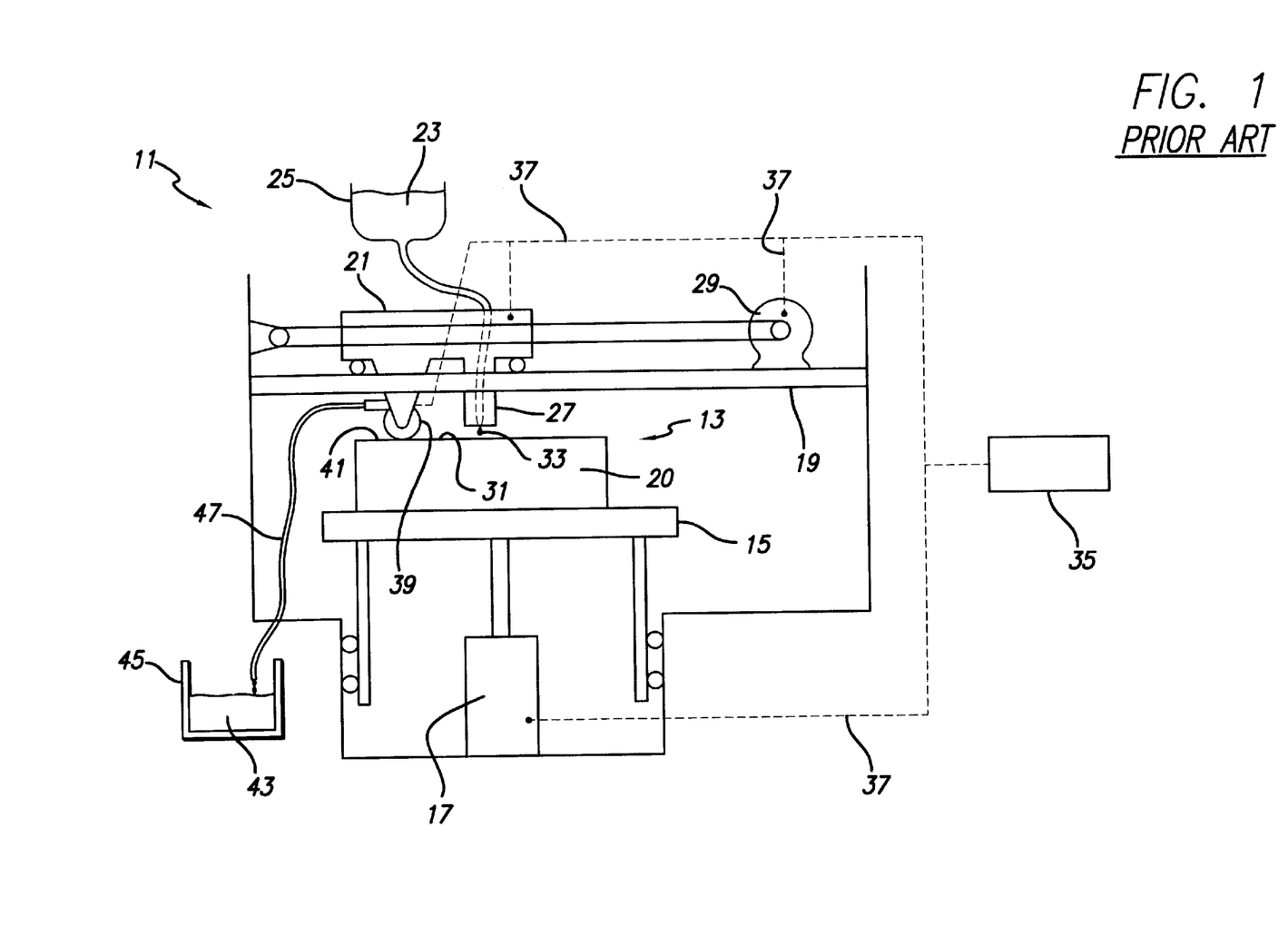
FIG. 1 is a schematic side view of an SDM apparatus using a prior art planarizer for dimensionally normalizing layers.

Referring particularly to the schematic illustration in FIG. 1, there is illustrated generally by the numeral 11 a prior art SDM apparatus that can be modified to practice the present invention. The SDM apparatus 11 is shown building a three-dimensional object indicated by the numeral 20. The object is built in a layer by layer manner on a build platform 15 that can be precisely positioned vertically by any conventional actuation means 17 within the build environment illustrated generally by the numeral 13. The object is built in a layer by layer manner by dispensing a build material. The build material which is preferably dispensed in a flowable state, can be a liquid, paste, powder, or the like. Typically with a phase change material, the build material is normally in a solid state and changes to a flowable state when maintained at or above the flowable temperature of the material. The build environment 13 is maintained at a temperature below the flowable temperature of the build material so that the three-dimensional part will solidify as the build material is dispensed. Directly above and parallel to the platform 15 is a rail system 19 on which a material dispensing trolley 21 resides. The dispensing trolley is fed a build material 23 from a material reservoir 25 that heats and maintains the material above its flowable temperature, thereby existing in its liquid or flowable state. Located on the dispensing trolley is at least one ink-jet print head 27 for dispensing the build material. The trolley is reciprocally driven along a horizontal path by a conventional drive means 29. Generally, the trolley 21 makes multiple passes to dispense one complete layer of material from the ink-jet print head 27. In FIG. 1, a portion of a layer of dispensed material 31 is shown as the trolley has just started its pass from left to right. Dispensed droplets 33 are shown in mid-flight, and the distance between the ink-jet print head 27 and the layer 31 of build material is greatly exaggerated for ease of illustration.

Preferably, a remote computer (not shown) generates a solid modeling CAD data file. The CAD data is then processed into three-dimensional coordinate data of an object commonly referred to as an STL file. When a user desires to build an object, a print command is executed at the remote computer in which the STL file is sent to a computer controller 35 of the SDM apparatus 11. The STL file or its equivalent can be transmitted to the computer controller 35 of the SDM apparatus 11 by any conventional data transferable medium desired, such as by magnetic disk tape, microelectronic memory, or the like. The computer controller 35 processes the STL file and creates data descriptive of each layer of the three-dimensional object which are used to build to object by the controller. The data transmission route and controls connected to the computer controller 35 of the SDM apparatus 11 are represented as dashed lines at 37.

In FIG. 1, a prior art planarizer 39 is used to successively shape the layers as needed. Such shaping is needed in order to eliminate the accumulated effects of drop volume variation, thermal distortion, and the like, which occur during the build process. Planarizers are also used, for example, in laser sintering systems such as the counter rotating drum planarizer disclosed in U.S. Pat. No. 5,017,753 to Deckard. The planarizer 39 is mounted to the material dispensing trolley 21 such that it is allowed to project from the underside of the platform by a sufficient amount in the Z-direction so that it contacts the layer of dispensed material 31 at a desired level. Specifically, it is the function of the planarizer to melt, transfer, and remove portions of the previously dispensed layer of build material in order to smooth it out and set a desired thickness for the last formed layer. This is referred to as "dimensionally normalizing" a layer. As used herein, the term "dimensionally normalizing" refers to the process of equalizing at least a portion of a layer of build material so that the portion of the layer achieves a desired thickness, flatness, and/or shape. The prior art planarizer 39 is utilized in building techniques that deposit build material in excess of a desired thickness for each layer according to data of a prescribed pattern for each layer, and then the planarizer removes the excess build material from each layer to achieve the desired thickness.

The planarizer 39 is heated by a heating element (not shown) located on the planarizer's axis of rotation. The heat transferred to the surface of the planarizer locally raises the temperature of the build material above its flowable temperature, thereby causing the material to transition to its molten state. Numeral 31 identifies a layer of build material that has just been deposited by the print head. The rotation of the planarizer or cylinder 39 sweeps molten material from the just-deposited layer 31, leaving in its path a smooth surface of build material 41. Some of the molten material adheres to planarizer 39, which is scraped off and disposed of as waste material 43 in bin 45 through waste umbilical 47.

Undesirably, the prior art rolling planarizer is expensive to manufacture and has moving parts that are subject to wear and degradation. It is also difficult to precisely regulate the surface temperature of the planarizer during operation. The planarizer is also thermally inefficient as much of the energy used to heat the planarizer is dissipated into the air. Furthermore, airborne particles have an undesirable tendency to accumulate on the planarizer, and the planarizer occupies a significant amount of space in the SDM apparatus. In addition, the planarizer generally is used to remove excess building material in building techniques that deposit build material in excess of the desired thickness of the layer. This undesirably produces waste material and slows down the build rate of the part. Also, because the planarizer makes physical contact the deposited material, the planarizer imposes additional limitations on the type of build material that can be dispensed by the SDM apparatus. For instance, many flowable materials are not acceptable for being planarized. For example, materials that exhibit brittle or elastic characteristics in a solid state are subject to gumming, tearing, cracking, or the like, when they are planarized, even though they may be perfectly acceptable for dispensing from an ink-jet print head. Thus, eliminating the use of a planarizer in an SDM apparatus is desirable.

In addition, the planarizer is typically used in open loop SDM techniques wherein the dimensional variability inherent in the layer-by-layer build process is neither monitored nor compensated for during the build process. Instead, open loop systems utilizing a planarizer effectively ignore the dimensional variability occurring during the build process because they dispense material in excess of the desired thickness, and then remove the excess. Although dimensional variability does not need to be monitored, the build rate of the object formed by the apparatus cannot be optimized to match the maximum build rate of the apparatus. For example, for any SDM apparatus there will be a weak spot or location in the build process that builds at the slowest rate. This weak spot or location establishes the maximum possible build rate of the apparatus. This weak spot or location is influenced by many factors, such as the geometry of the object being built, the targeting accuracy of the dispensing jets, degradation of the droplet size of the build material as it is dispensed, thermal fluctuations in the environment, and the like. In order to eliminate the dimensional variability of every layer, prior art open loop SDM methods deposit the build material in excess of the thickness of the weak spot, and thereby cannot build the three-dimensional object at the highest build rate possible for the print head. These problems are overcome according to the present invention.

Figure 2:
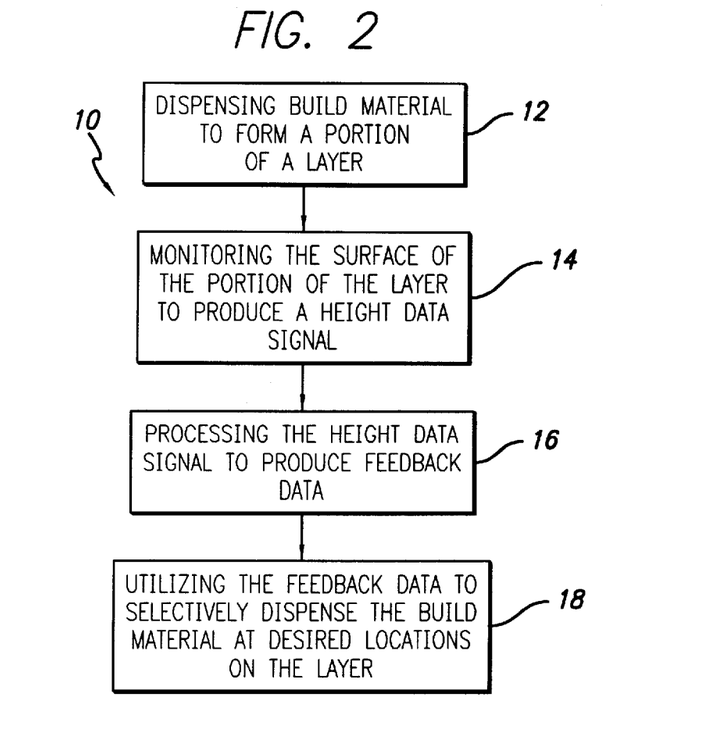
FIG. 2 is a flow chart of the present invention closed loop SDM method.

Now referring to FIG. 2, the method of the present invention is shown schematically at 10. The unique method 10 for forming a three-dimensional object by a closed loop SDM technique dispenses a build material in the form of discrete droplets in a layer by layer manner. The build material can be a powder, a liquid, a paste, or the like, and is preferably dispensed in a flowable state. The method comprises the steps of: 12 dispensing the build material to form a portion of a layer, 14 monitoring the surface of the portion of the layer to produce a height data signal, 16 processing the height data signal to produce feedback data, and 18 utilizing the feedback data to selectively dispense the build material at desired locations on the layer. The method is unique in that a closed loop system is established, wherein active feedback data is used to selectively target desired locations on the surface of the layer of the object for deposition of additional build material in order to dimensionally normalize the layer.

Figure 3:
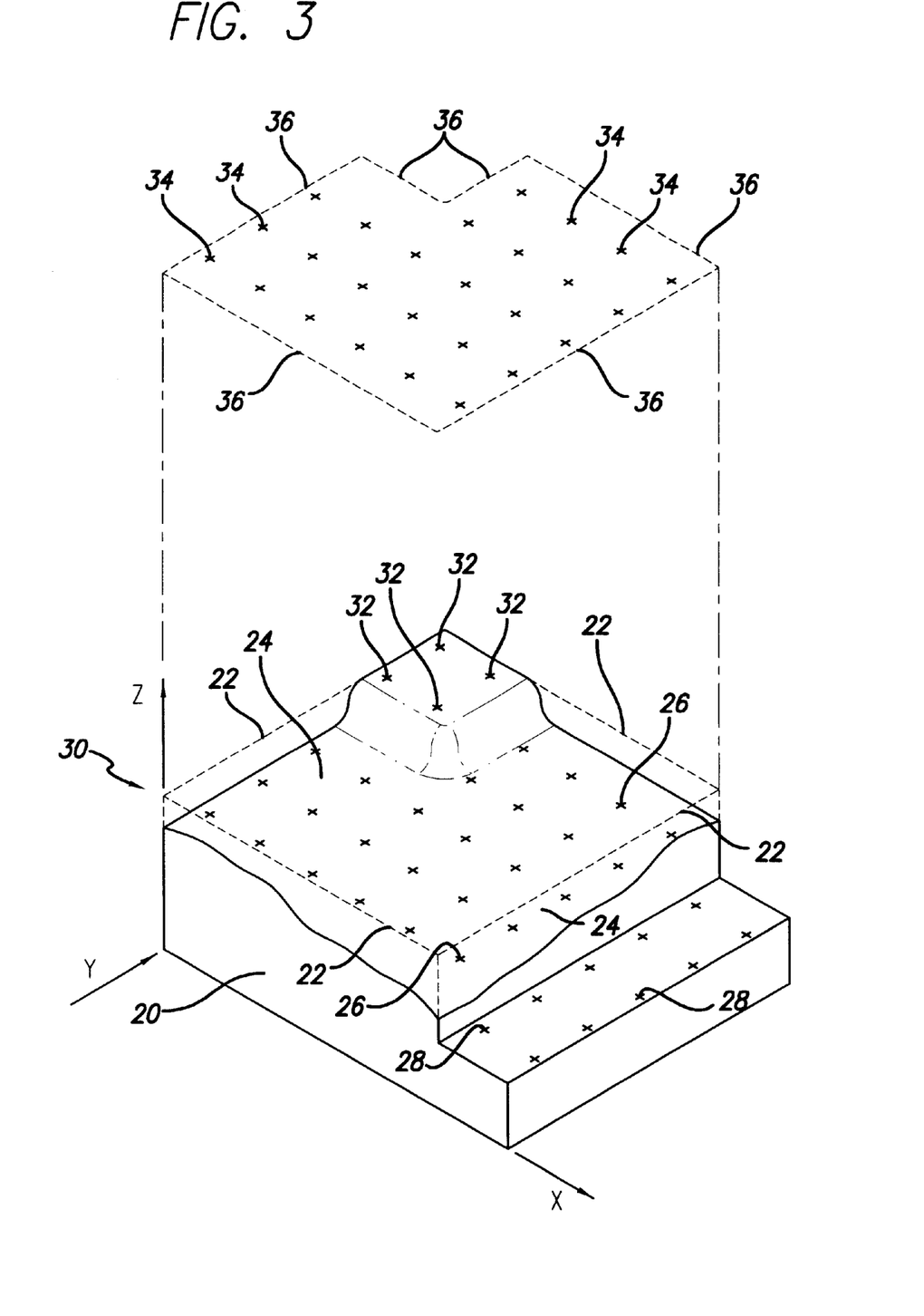
FIG. 3 is an isometric view of a portion of a layer of a three-dimensional object for illustrating the present invention closed loop SDM method.

Referring now to FIG. 3 the present invention method is graphically discussed wherein a three-dimensional object 20 is shown being built. The object 20 is built, layer by layer, substantially in the X/Y plane shown. For a given layer there corresponds data descriptive of the layer, which, for example, is schematically represented by the area enclosed by dashed lines 22. As stated in step 12 of FIG. 2, the build material is selectively dispensed to form a portion of a layer having a surface indicated at numeral 24 in FIG. 3. As stated in step 14 of FIG. 2, the surface 24 of the portion of the layer is monitored to produce at least one height data signal. In order to monitor the height of surface 24, measurements are taken at sample points indicated by numeral 26 by a surface scanning system (not shown in FIG. 3) to produce X, Y, and Z spatial coordinates corresponding to each sample point 26. The surface scanning system eliminates measurements of sample points that reside outside of the area enclosed by dashed lines 22, such as the sample points indicated by numeral 28. A predetermined Z height value indicated by numeral 30, is the desired height for the layer being formed and is a value typically associated with the data descriptive of the layer held by a computer controller 35. In the example shown in FIG. 3, four sample points indicated by the numeral 32 are shown that are presently at the predetermined Z height value. The height data signals corresponding to the sample points 26 are then processed to produce feedback data as indicated in step 16 of FIG. 2. The feedback data is represented in FIG. 3 as feedback signal locations 34 having X and Y values where additional build material is needed. As can be seen in FIG. 3, sample points 28 outside the area of the portion of the layer being formed are dropped in the processing step, as are the sample points 32 whose Z height spatial coordinate values equal that of the predetermined Z height value 30. As indicated in step 18 of FIG. 2, the feedback data is then utilized to selectively dispense the build material at desired locations of the layer. These desired locations are indicated by the superimposed area bounded by dashed lines 36. These closed loop steps are repeated until the layer is dimensionally normalized such that the Z height spatial coordinate values of all sample points within the area bounded by the data descriptive of the layer are equal to the predetermined Z height value 30. The process is then repeated to form the next layer, and so on, until the entire three-dimensional object is completed.

Figure 4:
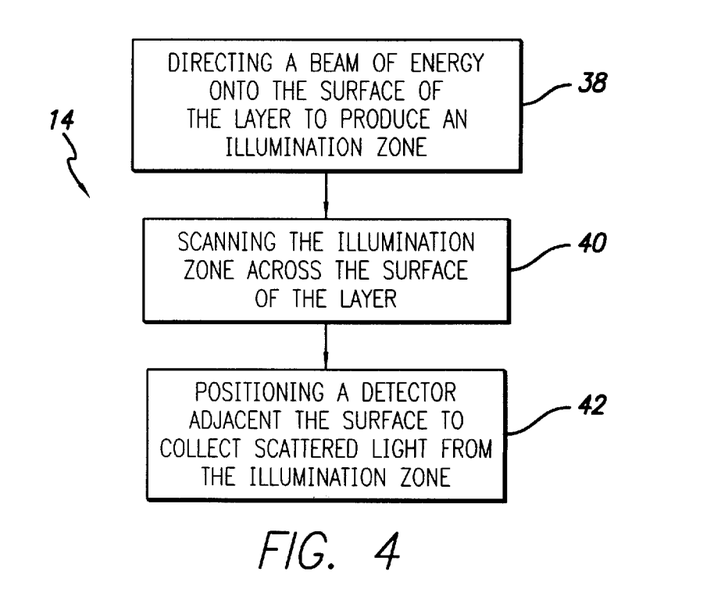
FIG. 4 is a flow chart of the steps for monitoring the surface of a portion of a layer of a three-dimensional object according to the present invention.

One embodiment of the surface monitoring step indicated at numeral 14 in FIG. 2 is described in greater detail in the steps shown in FIG. 4. Referring to FIG. 4, the surface monitoring step 14 of FIG. 2 comprises the first step of directing a beam of energy onto the surface of the layer to produce an illumination zone as indicated by the numeral 38 in FIG. 2. Preferably the beam of energy is a focused beam of light in the shape of a line or plane having a spot size or width that is equal to or less than pixel resolution achieved by the material dispenser. Lasers are well suited for this use, such as those commonly used in reading bar code labels on inventoried products, such as diode lasers. In addition, a line generating gas laser could be used, such as a He-Ne gas laser fitted with a cylindrical lens to expand the beam in one axis to form a plane. When the beam of energy is directed on the surface of the portion of the layer, an illumination zone is established on the surface, which emits scattered light. The second step involves scanning the illumination zone across the surface of the layer as indicated by the numeral 40 in FIG. 2. The third step involves positioning a detector adjacent the surface to collect scattered light from the illumination zone as indicated by the numeral 42 in FIG. 2. By collecting scattered light from the scanned illumination zone, measurements can be taken by the detector corresponding to the sample point locations shown at 26 in FIG. 3.

Figure 5:
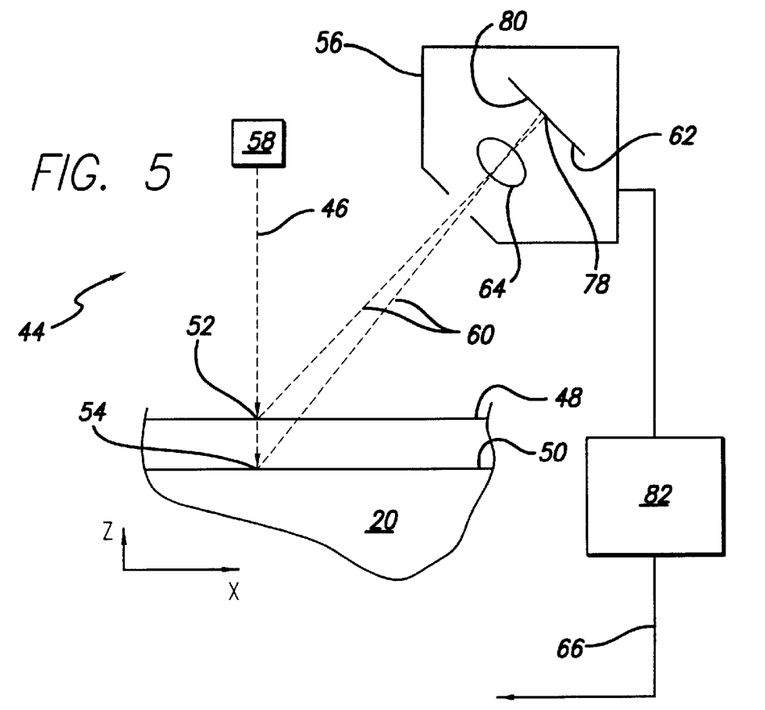
FIG. 5 is a schematic side view of a surface scanning system of the present invention.
Figure 6:
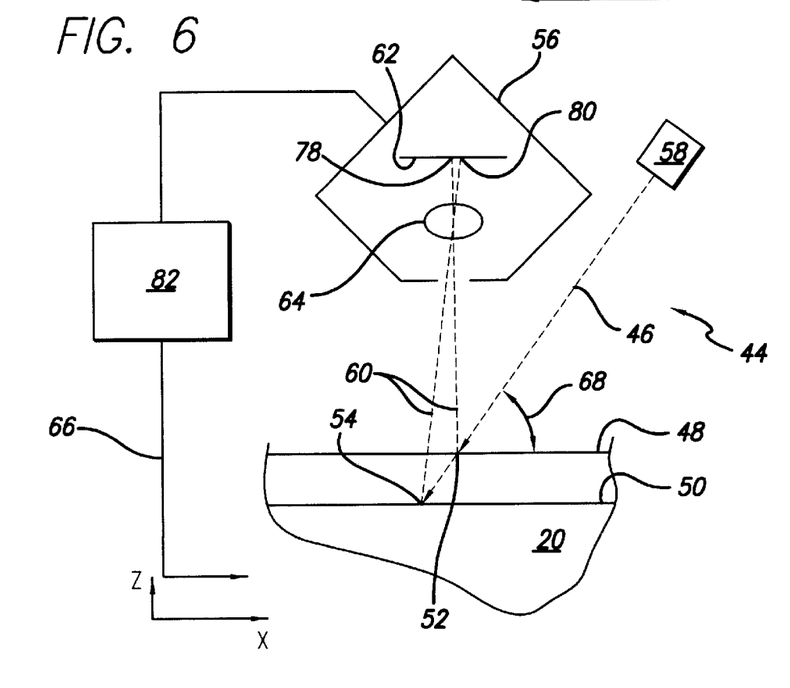
FIG. 6 is a schematic side view of an alternative embodiment of the surface scanning system of the present invention.

One embodiment of a surface scanning system is schematically shown by the numeral 44 in FIG. 5. The surface scanning system 44, shown in FIGS. 5 and 6, is adapted to carry out the surface monitoring step indicated at numeral 14 in FIGS. 2 and 4. The systems shown in FIGS. 5 and 6 operate on an active triangulation approach to obtain height measurements, although other approaches could be used, if desired. The surface scanning system 44 has a means for directing a beam of energy 46 onto the surface of a layer of the three-dimensional object being formed. Preferably a diode laser 58 is used to generate the beam of energy, although other types of lasers could be used, if desired. For purposes of illustration, the surface is indicated at two hypothetical locations, 48 and 50, to demonstrate two different Z height measurement values. An illumination zone is indicated by the numerals 52 and 54 respectively for the two surface height locations, 48 and 50. A detector 56 is positioned adjacent to the surfaces, 48 and 50, to collect the scattered light 60 emitted respectively from either illumination zone 52 or 54.

The detector 56 has a plurality of sensors that produce a response when energized by the scattered light 60. Preferably, the plurality of sensors reside on a focal plane 62 located within the detector 56. At least one optical element 64 is needed to focus the scattered light 60 on the focal plane 62 in order for the plurality of sensors to provide precise Z height measurement accuracy. As shown in FIGS. 5 and 6, the focused scattered light 60 emitted from the two different surfaces 48 and 50 contact the focal plane 62 at different sensor locations 78 and 80. Each response from the sensors is delivered to the processor 82 for producing height data signals that have an X, Y, and Z spatial coordinate value. As schematically represented by numeral 66, the height data signals are then delivered to a selective deposition modeling controller (not shown) for further processing to establish the feedback data as indicated at step 16 in FIG. 2.

Alternatively, the processor 82, may be eliminated by adapting the selective deposition modeling controller to process the height data signals directly from the detector in order to produce the feedback data, if desired.

Generally, most SDM devices utilize an ink-jet print head to dispense a flowable build material in a raster fashion and at a resolution of at least about 300 dpi (dots per inch). For an SDM apparatus dispensing a flowable wax material having, for example, a 10-inch by 10-inch build area, there would be approximately 10 million pixel locations in which flowable material could be deposited at 300 dpi. If it takes 10 seconds to dispense the build material for a particular layer, the scanning system would have to measure and process the sample points at a rate of approximately one million points a second, if each pixel location were to be monitored. Further, if the time it takes to dispense the material for a particular layer were substantially decreased, which is very desirable, the scanning system would have to make measurements at even higher rates if every pixel location were to be monitored. Thus, it is preferable to target a sample quantity of pixel locations for taking height data measurements, such as those schematically shown as sample point locations indicated by numeral 26 in FIG. 3. For example, if one in every ten pixel locations were sampled, the scanning system would only have to process the sample points at about 100,000 per second, which is well within the processing speeds of most digital signal processing chips currently available on the market.

In the embodiments shown in FIGS. 5 and 6, the detector 56 is preferably a video image sensor having a sensor resolution of at least 640×480. Low cost video image sensors, such as a charged coupled device (CCD) cameras, are currently available and are well suited for generating the sensor responses needed to produce the height data signals for the scanning system. One such camera is the Intel® Pro PC Camera made by the Intel Corporation of Santa Clara, Calif. Preferably the beam of energy 46 is projected perpendicular to the X/Y plane in which the object 20 is built as shown in FIG. 5. This is because the X and Y value of the height measurement point will remain fixed regardless if the layer is at surface level 48 or 50. However, some variance in the X and Y values for a given sample point is tolerable because representative sample point locations are taken, on average, to monitor the surface of the layer. Thus the beam of energy 46 can be projected at an acute angle as indicated at numeral 68 in FIG. 6, if desired.

Figure 8:
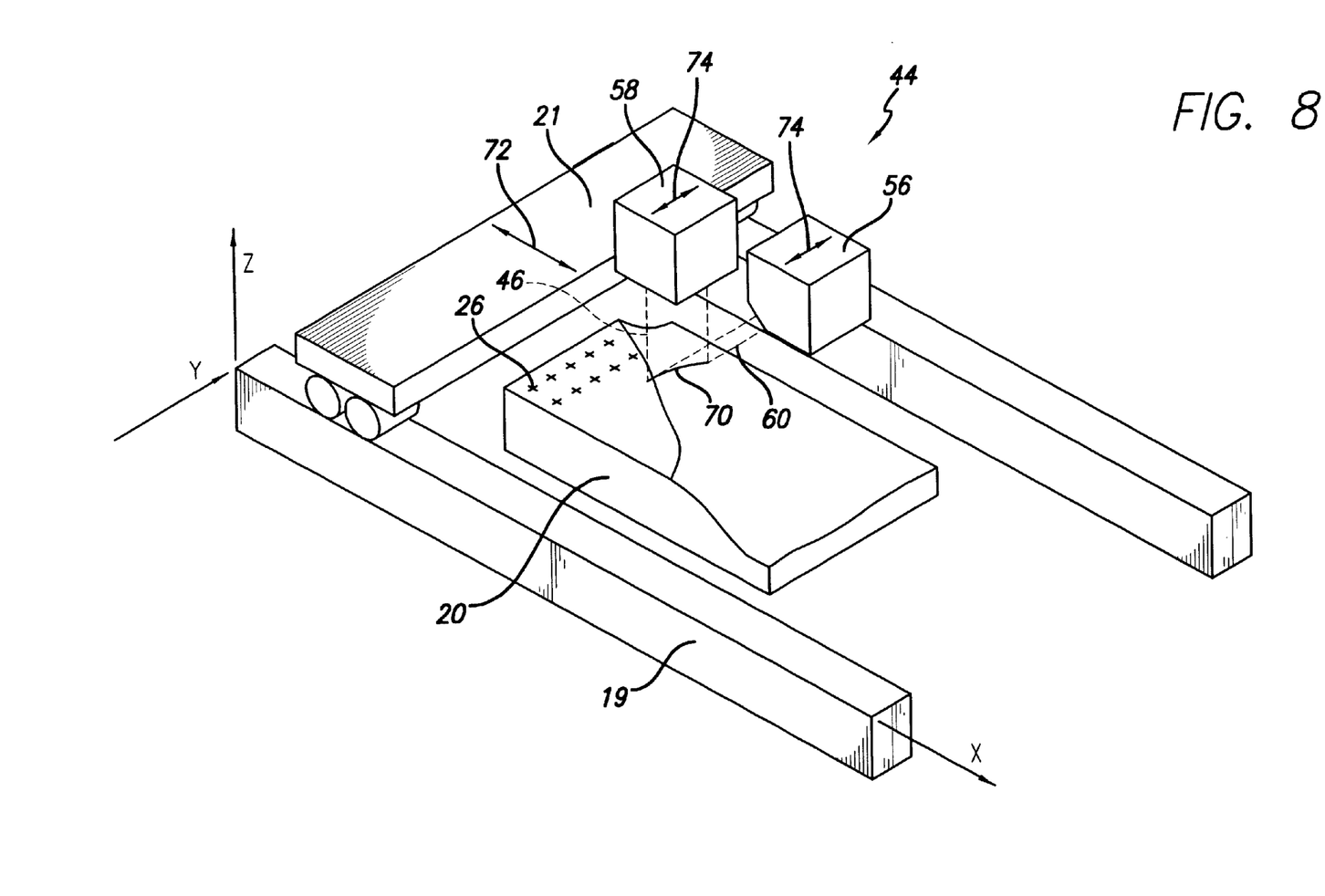
FIG. 8 is an isometric view of an embodiment of the surface scanning system.

The embodiment of the surface scanning system 44, shown schematically in FIG. 5, is further shown in FIG. 8 in conjunction with a schematic representation of a means for scanning the illumination zone 70 across the surface of a portion of the layer of the three-dimensional object 20. In this embodiment, the beam of energy 46 is focused in the shape of a plane that establishes an illumination zone 70 in the shape of a line on the object 20. The scattered light 60 emitted from the illumination zone 70 is monitored by the detector 56, which is held stationary with respect to the laser 58. The laser 58 and the detector 56 are movably mounted on the material dispensing trolley 21, which reciprocates in the X-direction as indicated by numeral 72. The material dispensing trolley 21 conventionally resides on rail system 19. Alternatively, the surface scanning system 44 could be mounted on a separate trolley system, if desired.

Figure 9:
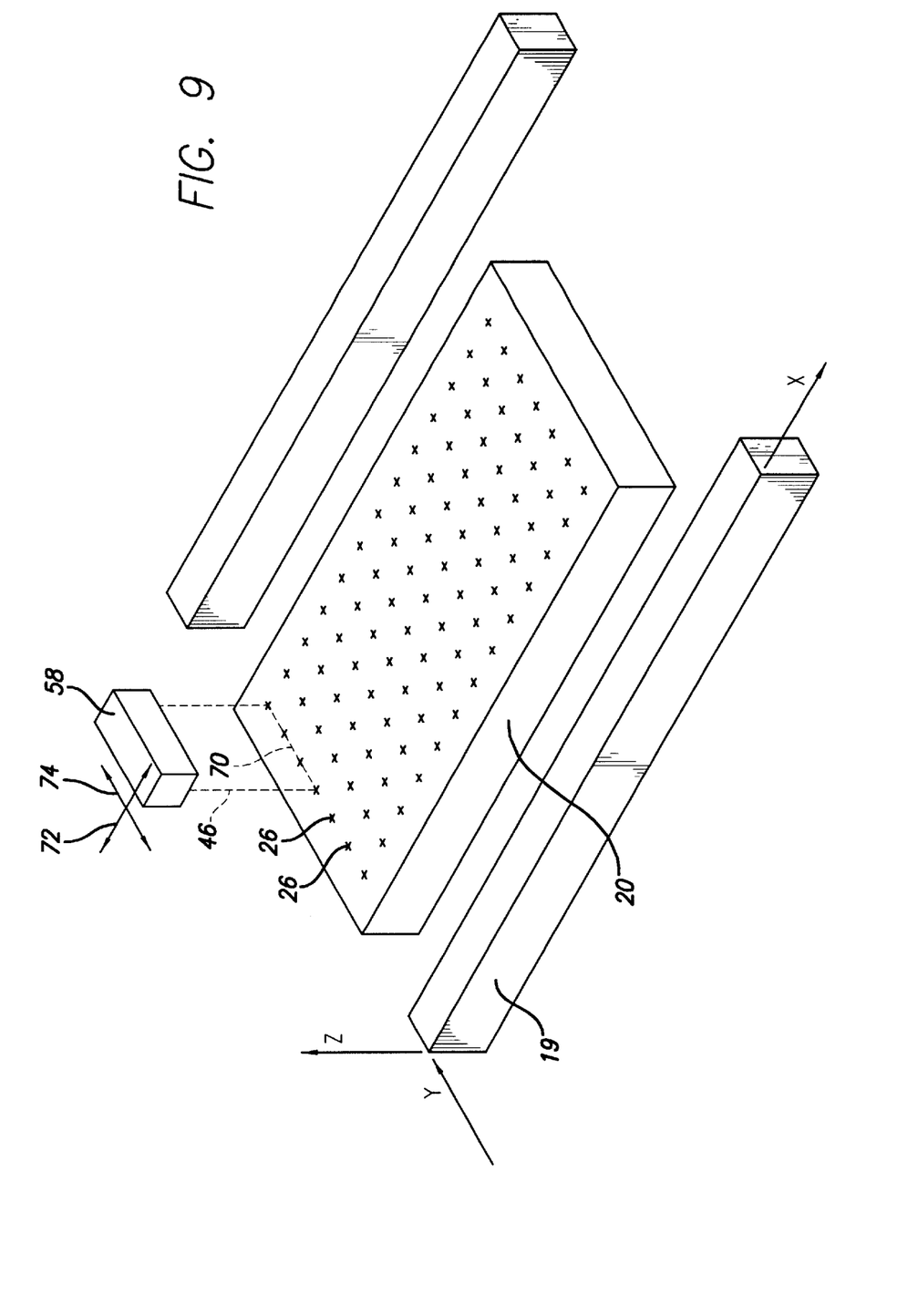
FIG. 9 is an isometric view of an embodiment of the illumination zone being scanned across a surface of an object being formed.
Figure 10:
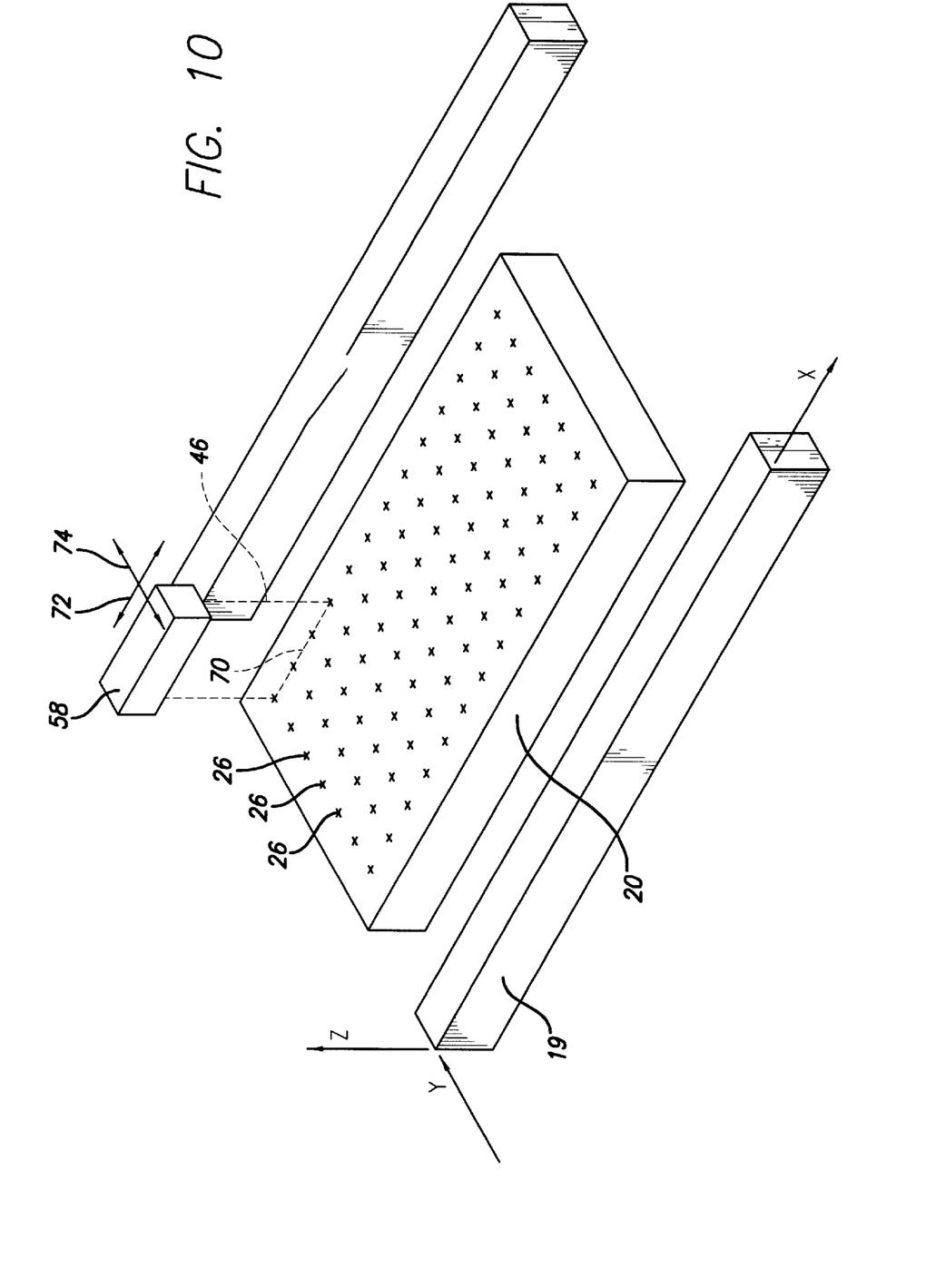
FIG. 10 is an isometric view of an alternative embodiment of the illumination zone being scanned across a surface of an object being formed.

As shown in FIGS. 8 through 10, if just one laser 58 and detector 56 are used, they may need to be shifted in the Y-direction (as indicated at numeral 74) after each reciprocation of the material dispensing trolley 21 in order to scan all the sample points 26 on the surface of the object 20 as it is built. This would particularly be required if the width of the beam of energy 46 were less than the width of the build area of the apparatus. Alternatively, a plurality of lasers and/or detectors could be used so that it would not be necessary to shift the scanning system 44 in the Y-direction, if desired. Furthermore, a sufficient number of lasers and/or detectors could be used such that they could be held stationary with respect to the X/Y plane, if desired.

FIGS. 9 and 10 show alternative directions for scanning the illumination zone 70 across the surface of the portion of the layer of the object 20. In FIG. 9, the linear illumination zone 70 runs parallel to the Y-axis, and in FIG. 10 the linear illumination zone 70 runs parallel to the X-axis. The illumination zone 70 could also be scanned in a diagonal direction with respect to the X-axis and Y-axis, if desired. In both FIGS. 9 and 10, height data signals must be instantaneously taken for the sample points 26 as the laser 58 travels in the X-direction (as indicated at numeral 72) along the dispensing trolley in a snapshot fashion. Depending on the speed at which these measurements can be taken, it is preferred to align the linear illumination zone 70 parallel to the Y-axis, as shown in FIG. 9. This is preferred because in two strokes of the dispensing trolley and with one shift of the laser 58 in the Y-direction, the entire surface within the build environment can be scanned. In contrast, the alignment shown in FIG. 10 would have eight strokes with four shifts of the laser to complete the scan of the surface within the build environment. This is because there are eight rows of sample points in the X-direction and the laser 58 shown can only scan two rows in one cycle.

Figure 7:
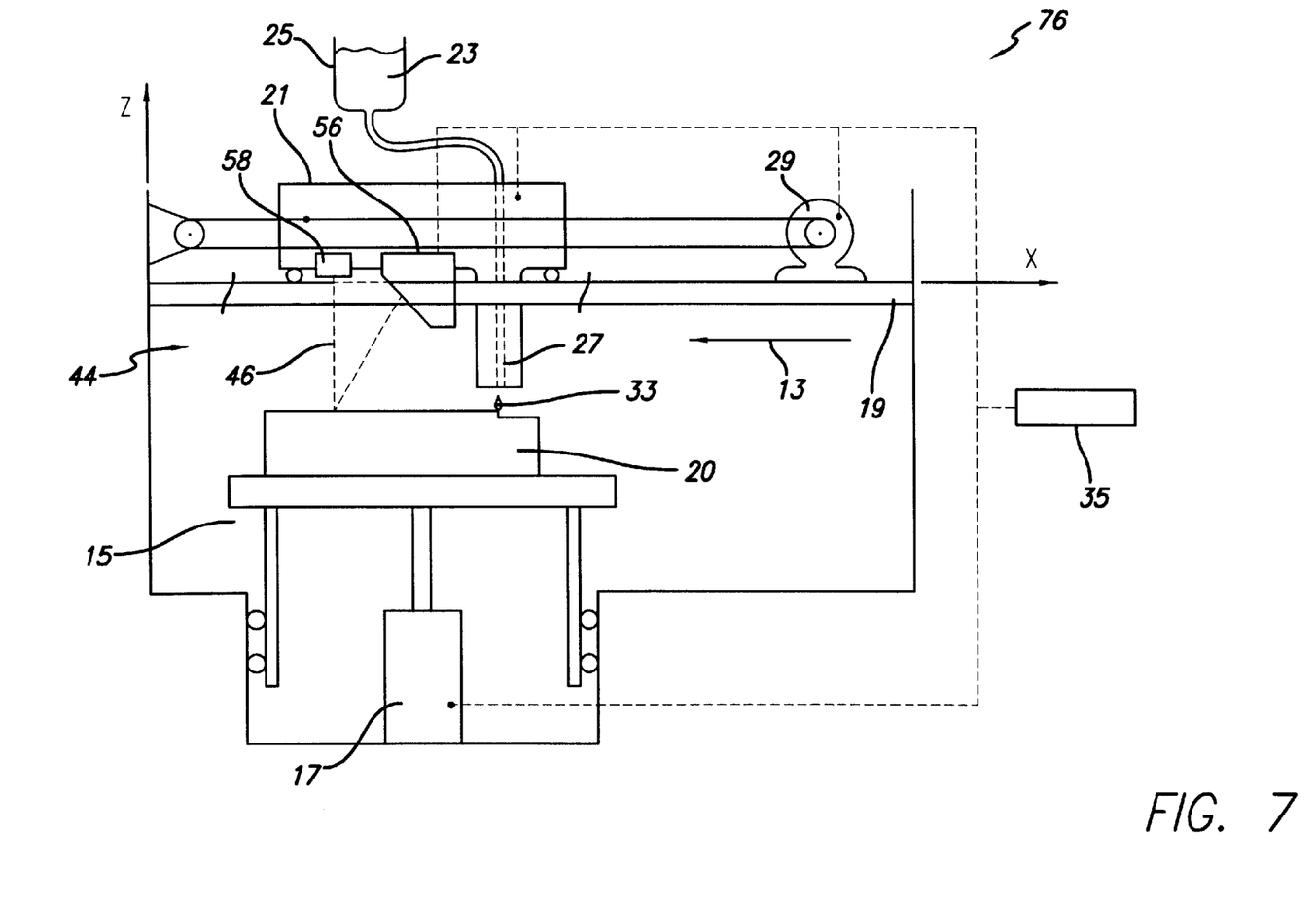
FIG. 7 is a schematic side view of an SDM apparatus incorporating the surface scanning system of the present invention.

Referring to FIG. 7, one example of employing the closed loop sensing system of the present invention is shown in an SDM apparatus generally at numeral 76. The SDM apparatus 76 has a build platform 15 for supporting the three-dimensional object 20 that can be precisely positioned vertically by any conventional actuation means 17 within the build environment illustrated generally by the numeral 13. When a flowable build material such as a wax is used, the object 20 is built in a layer by layer manner by dispensing droplets 33 of liquid wax material. The flowable build material can be any dispensable material, such as a sintered metal dispensed in a powder or paste form, if desired. In the example shown, the wax material is normally in a solid state and changes to a flowable state when maintained at or above the flowable temperature of the material by the apparatus. The build material reservoir 25 holds the wax build material 23 at a temperature above its flowable temperature while the build environment 13 is maintained at a temperature below the flowable temperature to induce solidification after the material has been dispensed. The dispensing trolley 21 is fed the build material 23 while in the flowable state for selective deposition onto a layer of the object 20. At least one ink-jet print head 27 is located on the dispensing trolley 21 which is reciprocally driven by a conventional drive means 29 along a rail system 19.

Also positioned on the dispensing trolley is the surface scanning system 44 having a laser 58 and a detector 56. The laser 58 projects the focused beam of light 46 onto the surface of the object 20 to establish the illumination zone 70 which emits scattered light that is monitored by the detector 56. In this embodiment, the computer controller 35 is configured to process the responses from the detector 56 to produce the height data signals and then to process the height data signals to produce the feedback data. This is preferred since the computer controller 35 already holds the data descriptive of the layer being formed, and because the computer controller also controls the selective dispensing of the build material from the dispensing trolley 21. Thus, the computer controller is well suited to process the height data signals to establish the feedback data and instruct the dispensing trolley 21 to selectively dispense the build material at the desired locations on the layer being formed.

Uniquely, the surface scanning system 44 of the closed loop SDM apparatus 76 actively monitors the surface of every layer of the object 20 being formed and provides feedback for selectively dispensing build material to desired locations on the object to dimensionally normalize every layer. The surface scanning system 44 provides a significant advantage over other methods of dimensionally normalizing the surface of a layer because no waste material is generated and because no physical contact is made with the layer. This allows for significant increases in build speeds and for the use of a wider variety of build materials that can be dispensed.

Any flowable material can be used according to the present invention so long as it can be selectively dispensed in a flowable state and solidify after being dispensed by any available means such as by thermal cooling and/or by application of synergistic stimulation. Materials such as wax or thermoplastic solidify soon after being dispensed and are well suited for use in the present invention, however other materials may be used, if desired. For example, particulate materials such as metal or ceramic powders could also be added to the flowable build material, if desired. In addition, powder materials mixed with a binder could also be used and can even be dispensed in paste form, if desired. Such build materials are well known in the art and can be selected based on a variety of considerations such as their final mechanical properties or for reasons of further processing. For example, a UV curable material could be dispensed in liquid or paste form and be cured by ultraviolet radiation, and/or a water-soluble material could be dispensed as a support structure for the three-dimensional object as it is being built. Also, powders could also be dispensed and solidified by laser sintering. Thus, the present invention can be practiced by dispensing more than one type of material and can be used in conjunction with additional processing steps, if desired.

Although the embodiments shown in the figures of the surface scanning system of the present invention are based on an active triangulation approach to measure depth, alternative systems or variations thereof can be used, if desired. Some alternative systems or variations known in the art are: stereo vision systems, range focus systems, time-of-flight systems, structured illumination systems, and Moire contouring systems, which, for example, are discussed in U.S. Pat. No. 6,147,760 to Geng. Specifically, alternative systems are disclosed in U.S. Pat. No. 5,870,220 to Migdal et al., U.S. Pat. No. 6,031,941 to Yano et al., and U.S. Pat. No. 4,939,379 to Horn, any of which system could also be used, if desired. A focus calibration system, which is one variety of a range focus system, could be used wherein a focused pencil beam of light is sent out from a camera and the radius of the circle of the illumination zone is measured to calculate the data height measurement. A time-of-flight system could also be used, wherein the time between the transmission of a light pulse from a transmitter to the surface of the object and back to a receiver is measured to calculate the data height measurement, if desired. Alternatively, an ultrasonic pulse could be used instead of a light pulse, if desired. In addition, a stereoscopic system could be used wherein at least two CCD cameras are located at known distances from each other to capture images that are processed by a pattern recognition system to obtain data height measurements. At present, however, stereoscopic systems are slow, often taking several minutes to complete a scan. A structured illumination system could also be used, wherein a CCD camera is used to simultaneously image a projection of an array of dots, stripes or grid, in a single snapshot of the surface. Also, a Moire contouring system could be used, wherein a series of straight lines in a grating pattern are projected on the surface which is viewed from another angle through a second grating pattern. Alternatively, a diffraction range finding method could be used, for example, as the one disclosed in U.S. Pat. No. 4,678,324 to De Witt, if desired. Whatever surface scanning system is used, however, it must be able to generate height data signals at a sufficient rate to be processed by an SDM apparatus to produce feedback data. The feedback data is then used by the apparatus in a closed loop manner to selectively dispense build material at desired locations on the layer of the object, and to avoid dispensing material in locations where excess material may be present.

What has been described are preferred embodiments in which modifications and changes may be made without departing from the spirit and scope of the accompanying claims.

What is claimed is:

1. A method for forming a three-dimensional object by a closed loop selective deposition modeling technique dispensing a build material in a X/Y plane in a layer by layer manner to achieve a desired layer thickness for each layer, the method comprising:

dispensing the build material according to data descriptive of a layer of the three-dimensional object to form at least a portion of the layer of the three-dimensional object;

monitoring a surface of the portion of the layer of the three-dimensional object to produce at least one height data signal;

processing the height data signal to produce feedback data, the feedback data comprising desired X/Y locations on the surface of the portion of the layer of the three-dimensional object that are lower than the desired layer thickness; and utilizing the feedback data to selectively dispense the build material at the desired X/Y locations on the surface of the portion of the layer to achieve the desired layer thickness.

2. The method of claim 1 wherein the height data signal corresponds to a sample point location on the surface of the portion of the layer of the three-dimensional object.

3. The method of claim 2 wherein the step of monitoring the surface of the portion of the layer further comprises the steps of:

directing at least one beam of energy onto the surface of the portion of the layer to produce an illumination zone on the surface that emits scattered light;

scanning the illumination zone across the surface of the portion of the layer;

positioning at least one detector adjacent the surface to collect the scattered light from the illumination zone in order to produce the height data signal.

4. The method of claim 3 wherein the detector has at least one optical element and a plurality of sensors residing in a focal plane, the optical element focusing the scattered light on the focal plane, each sensor producing response when energized by the focused scattered light, each response being processed to produce a height data signal having an X, Y, and Z spatial coordinate value.

5. The method of claim 4 wherein a plurality of height data signals are compared to the data descriptive of the layer when being processed to produce the feedback data.

6. The method of claim 5 wherein the Z spatial coordinate of each height data signal is compared to a predetermined Z height value, and the feedback data is produced corresponding to the height data signals whose Z spatial coordinate value is less than the predetermined Z height value.

7. The method of claim 6 wherein the layers of the three-dimensional object are substantially formed in the X/Y plane and the beam of energy is a focused beam of light in the shape of a line or a plane that is projected in a direction that is generally perpendicular to the X/Y plane.

8. The method of claim 7 wherein the feedback data comprises a plurality of feedback signals having X and Y coordinates corresponding to the desired locations on the portion of the surface of the layer of the three-dimensional object where additional build material is to be selectively dispensed.

9. The method of claim 8 wherein the build material is selectively dispensed from a plurality of orifices of an ink-jet print head, the feedback signals selectively triggering any number of the orifices to dispense the build material at the desired locations.

10. The method of claim 1 wherein the step of monitoring the surface of the portion of the layer is achieved by a stereoscopic imaging system.

11. The method of claim 1 wherein the step of monitoring the surface of the portion of the layer is achieved by a range focus imaging system.

12. The method of claim 1 wherein the step of monitoring the surface of the portion of the layer is achieved by a time-of-flight imaging system.

13. The method of claim 1 wherein the step of monitoring the surface of the portion of the layer is achieved by a structured illumination imaging system.

14. The method of claim 1 wherein the step of monitoring the surface of the portion of the layer is achieved by a Moire contouring imaging system.

15. A surface scanning system for producing at least one height data signal for a selective deposition modeling apparatus to selectively dispense build material at desired X/Y locations on the surface of a portion of a layer of a three dimensional object being formed that are lower than a desired layer thickness, the system comprising:

means for directing at least one beam of energy onto the surface of the portion of the layer of the three-dimensional object being formed in order to produce an illumination zone on the surface that emits scattered light;

means for scanning the illumination zone across the surface;

at least one detector positioned adjacent the surface to collect the scattered light from the illumination zone, the detector having a plurality of sensors, each producing a response when energized by the scattered light; and means for processing the response of any given sensor to establish the height data signal corresponding to at least one X/Y location on the surface of the portion of the layer that is lower than the desired layer thickness.

16. The system of claim 15 wherein the height data signal is processed to produce feedback data for selectively dispensing the build material at the desired locations.

17. The system of claim 16 wherein the detector has at least one optical element and a plurality of sensors residing in a focal plane, the optical element focusing the scattered light on the focal plane, each sensor producing a response when energized by the focused scattered light, each response being processed to produce a height data signal having an X, Y, and Z spatial coordinate value.

18. The system of claim 17 wherein the feedback data is produced by comparing the plurality of height data signals with data descriptive of the portion of the layer of the three-dimensional object being formed.

19. The system of claim 18 wherein the Z spatial coordinate of each height data signal is compared to a predetermined Z height value, and the feedback data is produced corresponding to the height data signals whose Z spatial coordinate value is less than the predetermined Z height value.

20. The system of claim 19 wherein the layers of the three-dimensional object are substantially formed in the X/Y plane and the beam of energy is a focused beam of light that is projected in the shape of a line or a plane and in a direction that is generally perpendicular to the X/Y plane.

21. The system of claim 20 wherein the feedback data comprises a plurality of feedback signals having X and Y coordinates corresponding to the desired locations on the portion of the surface of the layer of the three-dimensional object where additional build material is to be selectively dispensed.

22. The system of claim 21 wherein the build material is selectively dispensed from a plurality of orifices of an ink-jet print head, the feedback signals selectively triggering any number of the orifices to dispense the build material at the desired locations.

23. A closed loop selective deposition modeling apparatus for forming a three-dimensional object by dispensing a build material in a layer by layer manner, the apparatus comprising:

a platform for supporting the three-dimensional object as it is being formed;

a dispenser for dispensing the build material to form the layers of the three-dimensional object as it is being formed;

a controller in communication with the dispenser for selectively dispensing the build material according to data descriptive of a layer for each layer of the three-dimensional object;

a movement means in communication with the controller and the dispenser; and a surface scanning system in communication with the controller for producing at least one height data signal corresponding to a sample point location on a surface of a portion of a layer of the three-dimensional object being formed that is lower than a desired layer thickness, the height data signal being processed by the controller to produce feedback data for the dispenser to selectively dispense build material at desired X/Y locations on the surface of the portion of the layer to achieve the desired layer thickness.

24. The apparatus of claim 23 wherein the surface scanning system further comprises:

means for directing at least one beam of energy onto the surface of the portion of the layer of the three-dimensional object being formed in order to produce an illumination zone on the surface that emits scattered light;

means for scanning the illumination zone across the surface;

at least one detector positioned adjacent the surface to collect the scattered light from the illumination zone, the detector having a plurality of sensors, each producing a response when energized by the focused scattered light; and means for processing the response of any given sensor to establish the height data signal.

25. The apparatus of claim 24 wherein the detector has at least one optical element and a plurality of sensors residing in a focal plane, the optical element focusing the scattered light on the focal plane, each sensor producing a response when energized by the focused scattered light, each response being processed to produce a height data signal having an X, Y, and Z spatial coordinate value.

26. The apparatus of claim 23 wherein the surface scanning system is a stereoscopic imagines system.

27. The apparatus of claim 23 wherein the surface scanning system is a range focus imaging system.

28. The apparatus of claim 23 wherein the surface scanning system is a time-of-flight imaging system.

29. The apparatus of claim 23 wherein the surface scanning system is a structured illumination imaging system.

30. The apparatus of claim 23 wherein the surface scanning system is a Moire contouring imaging system.

* * * * *

UNITED STATES PATENT AND TRADEMARK OFFICE
CERTIFICATE OF CORRECTION

PATENT NO. : 6,492,651 B2
DATED : December 10, 2002
INVENTOR(S) : Thomas A. Kerekes It is certified that error appears in the above-identified patent and that said Letters Patent is hereby corrected as shown below:

Column 14,
Line 58, "imagines system." should read -- imaging system. --

Signed and Sealed this

Fifteenth Day of July, 2003

JAMES E. ROGAN
*Director of the United States Patent and Trademark Office*